US012606248B2

(12) United States Patent
Bowers et al.

(10) Patent No.: US 12,606,248 B2
(45) Date of Patent: Apr. 21, 2026

(54) VEHICLE COWL ASSEMBLY

(71) Applicant: NISSAN NORTH AMERICA, INC.,
Franklin, TN (US)

(72) Inventors: Kenneth Bowers, Romeo, MI (US);
Jason Nantais, Royal Oak, MI (US)

(73) Assignee: NISSAN NORTH AMERICA, INC.,
Franklin, TN (US)

( * ) Notice: Subject to any disclaimer, the term of this
patent is extended or adjusted under 35
U.S.C. 154(b) by 394 days.

(21) Appl. No.: 18/072,604

(22) Filed: Nov. 30, 2022

(65) Prior Publication Data

US 2024/0174296 A1 May 30, 2024

(51) Int. Cl.
B62D 25/08 (2006.01)
B62D 29/04 (2006.01)

(52) U.S. Cl.
CPC .......... B62D 25/081 (2013.01); B62D 29/04
(2013.01)

(58) Field of Classification Search
CPC ...................................................... B60J 1/02
USPC ...................................... 296/192, 96.21, 201
See application file for complete search history.

(56) References Cited

U.S. PATENT DOCUMENTS

| | | | | | |
|---|---|---|---|---|---|
| 5,692,953 | A * | 12/1997 | Bell | .......... | B60H 1/28 |
| | | | | | 296/192 |
| 6,921,126 | B2 * | 7/2005 | Suh | .......... | B62D 25/088 |
| | | | | | 296/203.02 |
| 7,316,448 | B2 * | 1/2008 | Koyama | .......... | B60H 1/28 |
| | | | | | 296/192 |

| | | | | | |
|---|---|---|---|---|---|
| 7,357,446 | B2 * | 4/2008 | Sakai | .......... | B62D 25/081 |
| | | | | | 296/192 |
| 8,002,335 | B2 * | 8/2011 | Usuda | .......... | B62D 29/005 |
| | | | | | 296/203.02 |
| 8,308,224 | B2 * | 11/2012 | Ishii | .......... | B62D 25/081 |
| | | | | | 296/192 |
| 8,641,130 | B2 * | 2/2014 | Morden | .......... | B62D 25/081 |
| | | | | | 296/192 |
| 8,757,706 | B2 * | 6/2014 | Sasaki | .......... | B60J 1/02 |
| | | | | | 296/192 |
| 8,915,538 | B2 * | 12/2014 | Bland | .......... | B62D 29/04 |
| | | | | | 296/192 |
| 9,033,403 | B2 * | 5/2015 | Renke | .......... | B62D 65/06 |
| | | | | | 296/192 |
| 9,623,913 | B2 * | 4/2017 | Yamamoto | .......... | B62D 25/24 |
| 10,549,786 | B2 * | 2/2020 | Horimizu | .......... | B60R 21/34 |
| 2009/0261621 | A1 * | 10/2009 | Usuda | .......... | B62D 25/081 |
| | | | | | 296/192 |
| 2010/0187862 | A1 * | 7/2010 | Kurata | .......... | B60R 13/07 |
| | | | | | 296/192 |
| 2012/0091756 | A1 * | 4/2012 | Suzuki | .......... | B62D 25/081 |
| | | | | | 296/192 |
| 2015/0197285 | A1 * | 7/2015 | Hayakawa | .......... | B62D 25/081 |
| | | | | | 296/192 |

FOREIGN PATENT DOCUMENTS

KR 19980017384 U * 7/1998 ............. B62D 25/08

* cited by examiner

*Primary Examiner* — Amy R Weisberg
*Assistant Examiner* — Veronica M Condo
(74) *Attorney, Agent, or Firm* — Spencer Fane, LLP

(57) ABSTRACT

A vehicle cowl assembly includes a cowl cover. The cowl cover has an upper surface and a lower surface with a contoured edge shaped to conform to a lower portion of a glass windscreen. The lower surface of the cowl cover includes at least one reinforcement bracket fixed thereto positioned adjacent to the contoured edge.

20 Claims, 8 Drawing Sheets

VEHICLE COWL ASSEMBLY

BACKGROUND

Technical Field

The present disclosure generally relates to a vehicle cowl assembly. More specifically, the present disclosure relates to a vehicle cowl assembly that includes a reinforced cowl cover that covers a cowl area of a vehicle at the base of a windscreen.

Background Information

The cowl area of a vehicle at the base of a glass windscreen (also referred to as a windshield) of many vehicles is often redesigned and reconfigured to suit the overall design appearance of the vehicle. Such redesigns sometimes lead to warpage of a cowl cover that covers and conceals components such as a windshield wiper motor and/or windshield wiper movement linkage.

SUMMARY

In accordance with one object of the present disclosure, a cowl cover is provided with reinforcement brackets in order to stiffen the cowl cover and prevent warpage of the cowl cover.

In view of the state of the known technology, one aspect of the present disclosure is to provide a vehicle cowl assembly that includes a cowl cover. The cowl cover has an upper surface and a lower surface with a contoured edge shaped to conform to a lower portion of a glass windscreen. The lower surface of the cowl cover includes at least one reinforcement bracket fixed thereto positioned adjacent to the contoured edge.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
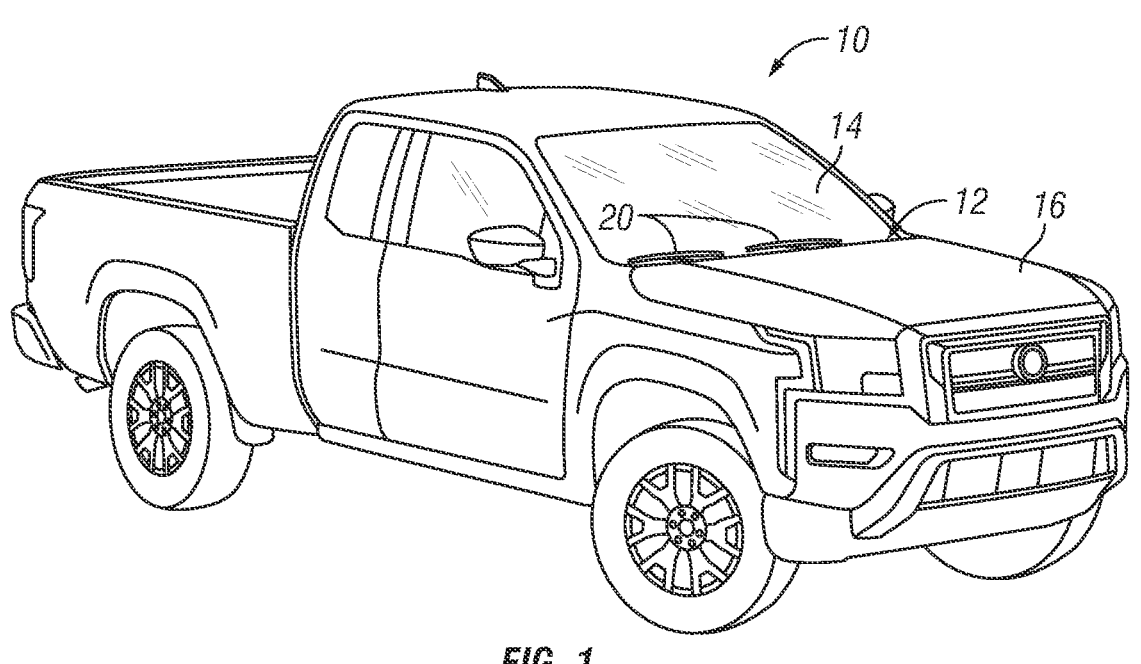
FIG. 1 is a perspective view of a vehicle that includes a windscreen, front hood and a cowl area defined therebetween in accordance with an exemplary embodiment.

Referring initially to FIG. 1, a vehicle 10 having a cowl area 12 defined along the bottom portion of a glass windscreen 14 between the windscreen 14 and a front hood 16 of the vehicle 10 is illustrated in accordance with a first embodiment.

Figure 2:
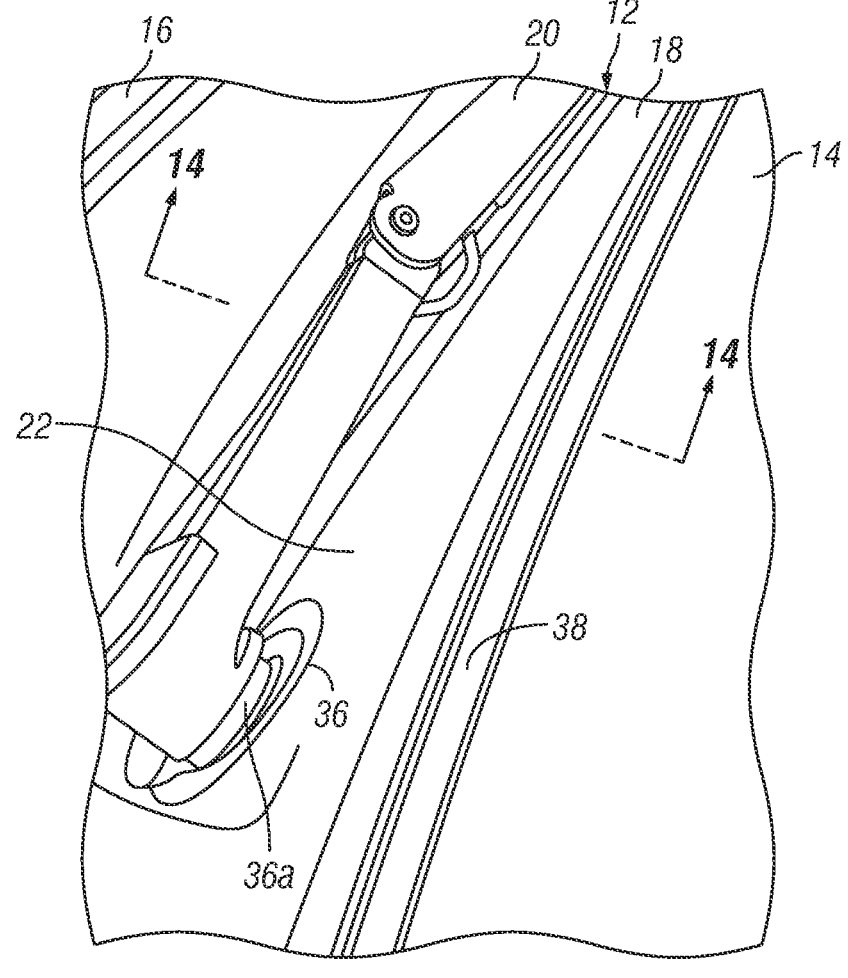
FIG. 2 is a rear perspective view of the cowl area of the vehicle depicted in FIG. 1, showing the cowl area of the vehicle including a lower end of the windscreen, one of a pair of windshield wipers, a rearward end of the front hood and an upper surface of a cowl cover in accordance with the exemplary embodiment.

As shown in FIG. 2, the cowl area 12 includes a cowl cover 18 that covers mechanical and electric components located beneath the cowl cover 16, such as the mechanical connections and electric motor (not shown) of windshield wipers 20.

The cowl cover 18 defines an upper surface 22 (FIG. 2), a lower surface 24 (FIGS. 3, 4 and 5), a rearward end 26 (also referred to as the contoured edge 26), a forward end 28 and lateral ends 30 and 32. The rearward end 26 is basically a contoured edge of the cowl cover 18 that is shaped to conform to a lower portion of a glass windscreen 14. The cowl cover 18 is molded from a thermoplastic polymer that is flexible but has resilient properties such that the cowl cover 18 retains is original shape. For example, the thermoplastic polymer can be polypropylene, or any of a variety of polymer materials with similar physical properties.

The cowl cover 18 also includes a first windshield wiper area 34 and a second windshield wiper area 36. The first windshield wiper area 34 has an opening 34a that receives a shaft (not shown) that supports and rotates one of the windshield wipers 20. The second windshield wiper area 36 also has an opening 36a that receives a shaft (not shown) that supports and rotates the other of the windshield wipers 20. Since windshield wipers, corresponding motor(s) and support shafts are conventional vehicle components, further description is omitted for the sake of brevity.

Figure 3:
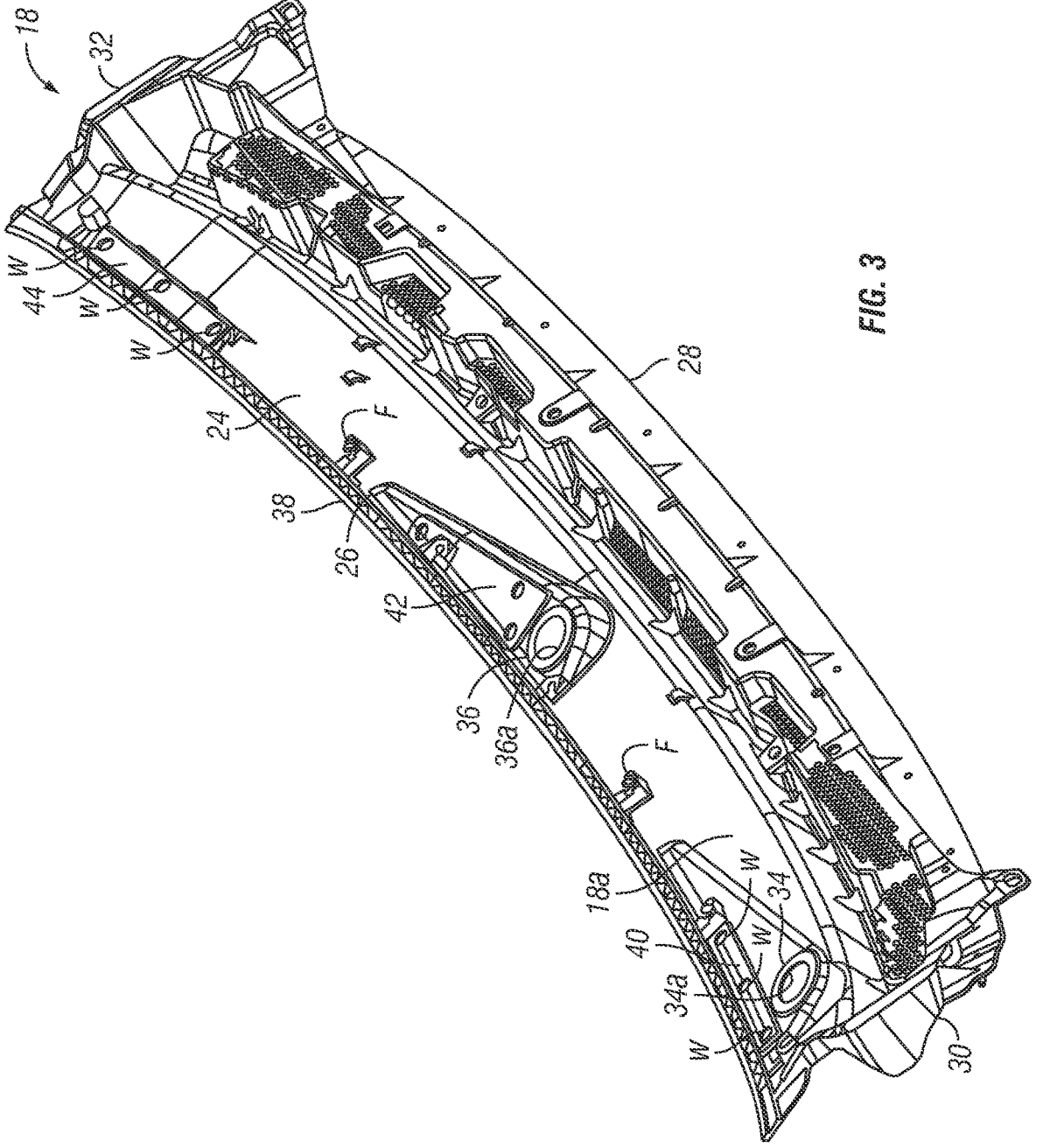
FIG. 3 is a perspective view of a lower surface of the cowl cover showing a plurality snap-fitting projections, first and second windshield wiper areas along with first, second and third reinforcement brackets attached to the lower surface of the cowl cover at predetermined locations in accordance with the exemplary embodiment.
Figure 4:
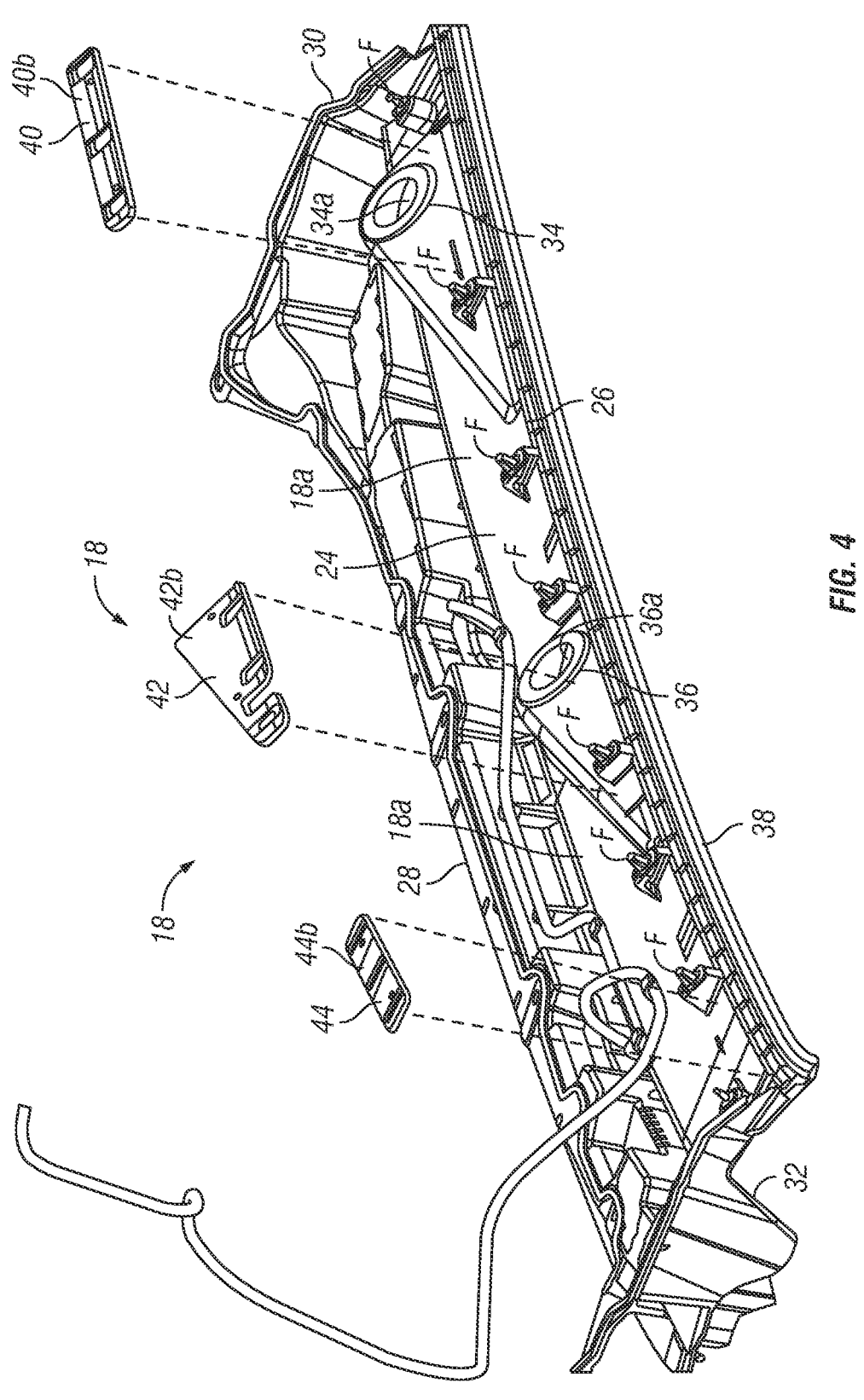
FIG. 4 is an exploded perspective view of the lower surface of the cowl cover showing the first, second and third reinforcement brackets separated from the lower surface of the cowl cover in accordance with the exemplary embodiment.
Figure 5:
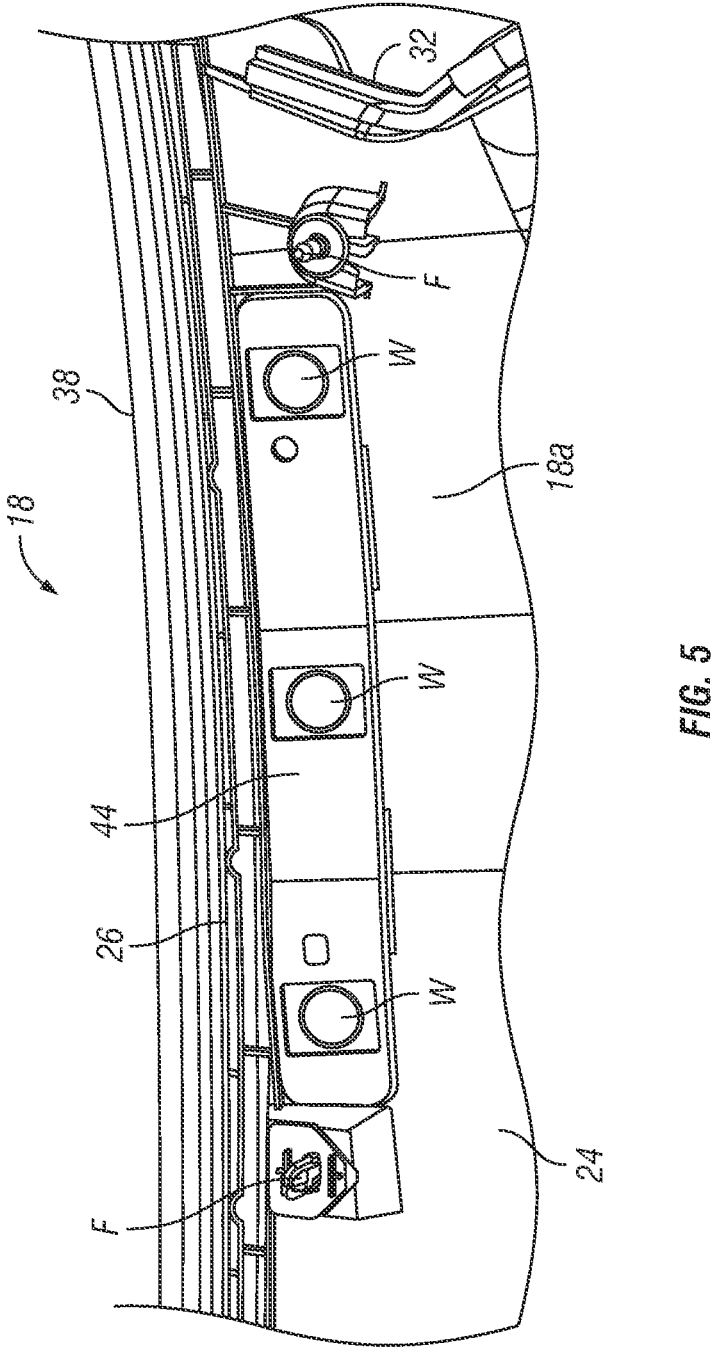
FIG. 5 is a bottom view of one lateral end of the lower surface of the cowl cover showing the third reinforcement bracket welded to the lower surface of the cowl cover in accordance with the exemplary embodiment.

As shown in FIGS. 3, 4 and 5, the lower surface 24 of the cowl cover 18 includes a plurality of snap-fitting projections F (also referred to as fasteners F) that snap-fit into mating openings (not shown) formed in vehicle structure(s) within the cowl area 12 beneath the cowl cover 18. The snap-fitting projections F are formed at locations along the lower surface 24 adjacent to but spaced apart from the rearward end 26 (the contoured edge 26). Since snap-fitting projections (fasteners) and corresponding mating openings for receiving snap-fitting projections are conventional structures well known in the art, further description of snap-fitting projections (fasteners) and corresponding mating openings for receiving snap-fitting projections is omitted for the sake of brevity.

Figure 14:
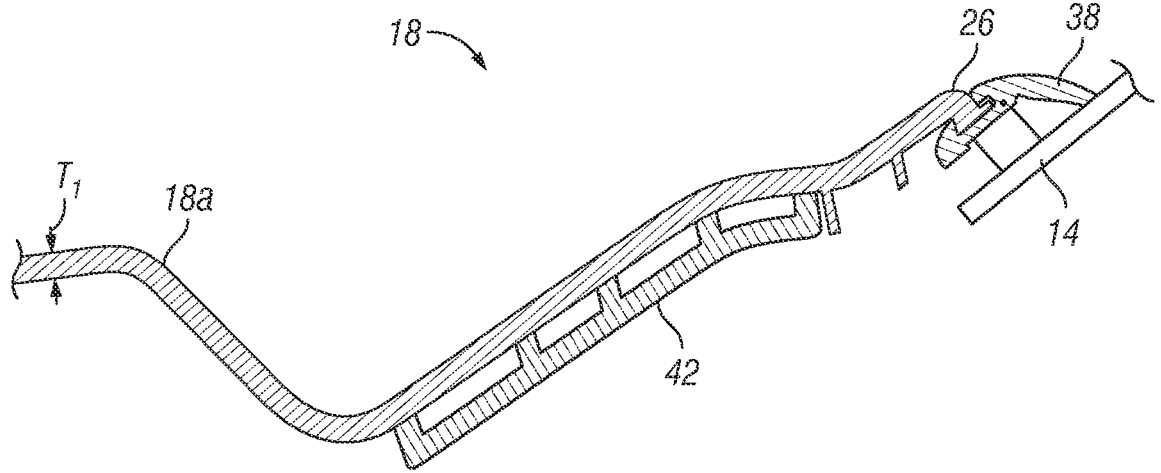
FIG. 14 is a cross-sectional view of a portion of the cowl cover and the glass windscreen taken along the line 14-14 in FIG. 2 showing the cowl cover with the upper surface of the second reinforcement bracket welded to the lower surface of the cowl cover in accordance with the exemplary embodiment.

A lip member 38 attaches to the rearward end 26 of the cowl cover 18, as shown in FIG. 14. The lip member 38 is a conventional member that extends along the entire length (in a vehicle lateral direction) of the rearward end 26 contacts a lower end of the glass windscreen 14, as shown in FIGS. 2 and 14.

The lower surface 24 of the cowl cover 18 also includes a first reinforcement bracket 40 (FIGS. 6-8), a second reinforcement bracket 42 (FIGS. 9-11) and a third reinforcement bracket 44 (FIGS. 12 and 13) that are all fixed to the lower surface 24 at predetermined locations adjacent to the rearward end 26 (also referred to herein as the contoured edge 26).

As shown in FIG. 14, the cowl cover 18 has a first thickness $T_1$ in a main area 18a of the cowl cover 18. In areas with the stiffening ribs, the plurality of snap-fitting projections F, and the areas having corresponding ones of the first, second and third reinforcement brackets 40, 42 and 44, the thickness of the cowl cover 18 is greatly increased and can be as much as twice the thickness $T_1$ or greater.

Areas such as the first windshield wiper area 34 and the second windshield wiper area 36 are also formed with the first thickness $T_1$. However, it should be understood that some areas of the cowl cover 18 including the first and second windshield wiper areas 34 and 36 can alternatively be thicker than the first thickness $T_1$ without the first, second and third reinforcement brackets 40, 42 and 44.

Figures 6, 7, 8:
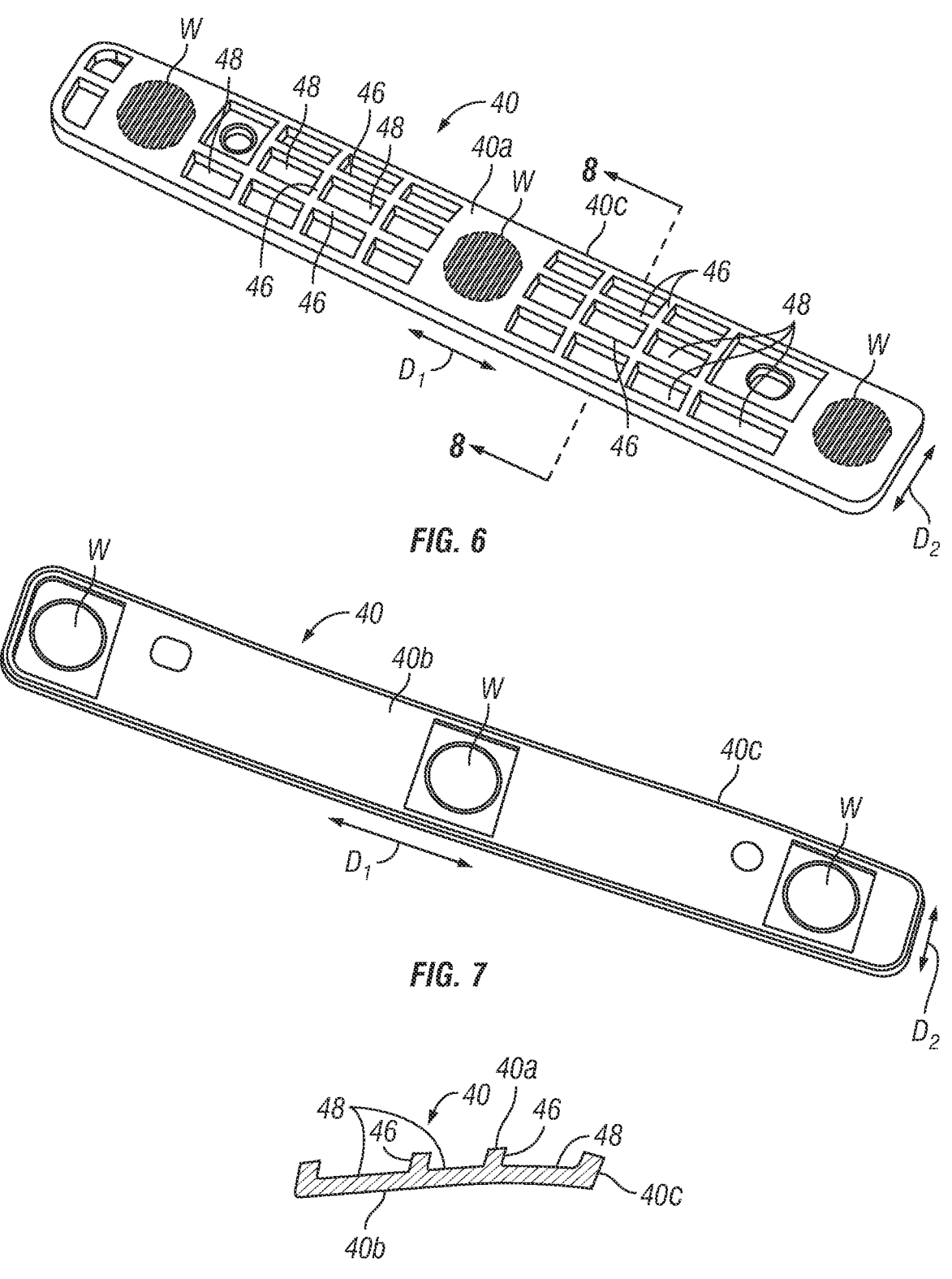
FIG. 6 is a perspective view of an upper surface of the first reinforcement bracket shown removed from the cowl cover in accordance with the exemplary embodiment.
FIG. 7 is a perspective view of a lower surface of the first reinforcement bracket shown removed from the cowl cover in accordance with the exemplary embodiment.
FIG. 8 is a cross-sectional view of the first reinforcement bracket taken along the line 8-8 in FIG. 6 in accordance with the exemplary embodiment.

As shown in FIGS. 6-8, the first reinforcement bracket 40 has an upper surface 40a (FIG. 6) and a lower surface 40b (FIG. 7). The first reinforcement bracket 40 defines a lengthwise direction $D_1$ and a widthwise direction $D_2$. As shown in FIGS. 6 and 8, the upper surface 40a of the first reinforcement bracket 40 includes a plurality of ribs 46, with some of the ribs 46 extending in the lengthwise direction $D_1$ and some of the ribs 46 extending in the widthwise direction $D_2$. A plurality of recessed areas 48 are defined between the ribs 46, as shown in FIGS. 6 and 8. The ribs 46 provide rigidity and strength to the first reinforcement bracket 40.

As shown in FIG. 8, the first reinforcement bracket 40 is not entirely flat. Rather, adjacent to a rearward end 40c, the first reinforcement bracket 40 has a curved or contoured shape that corresponds to the curvature and contoured shape of the cowl cover 18 where the first reinforcement bracket 40 is installed.

As shown in FIG. 3, the first reinforcement bracket 40 is installed to the lower surface 24 of the cowl cover at a location adjacent to the first windshield wiper area 34. Hence, the ribs 46 contact the lower surface of the first reinforcement bracket 40. The first reinforcement bracket 40 extends rearward and inboard along the first windshield wiper area 34. The upper surface 40a is installed to the lower surface 24 of the first reinforcement bracket 40. One end (in the widthwise direction $D_2$) of the first reinforcement bracket 40 is located between the contoured edge 26 and the opening 34a. The first reinforcement bracket 40 is also preferably made of a thermoplastic polymer such as polypropylene.

Figure 9:
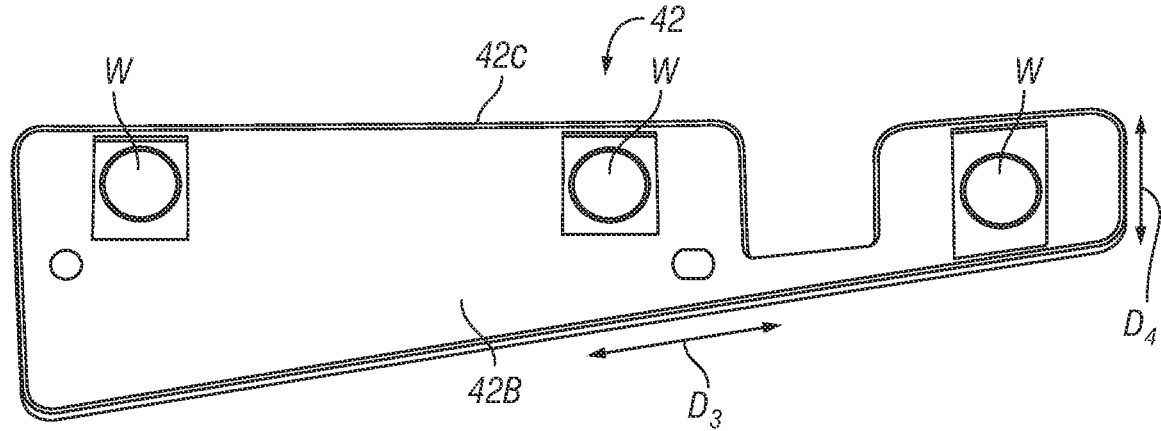
FIG. 9 is a perspective view of an upper surface of the second reinforcement bracket shown removed from the cowl cover in accordance with the exemplary embodiment.
Figure 10:
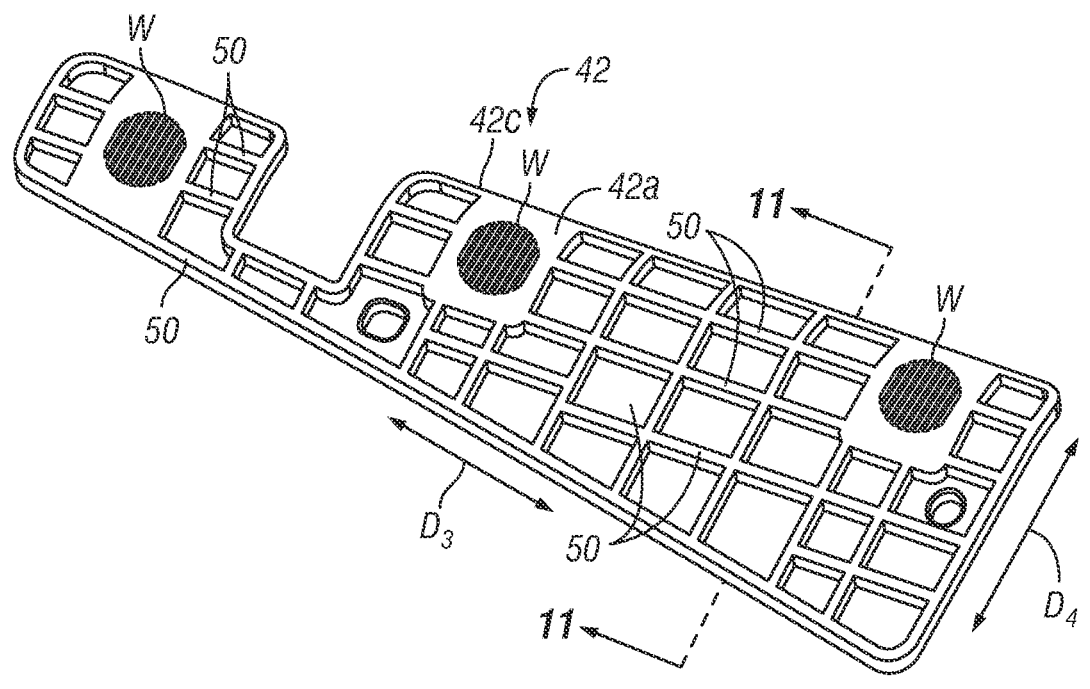
FIG. 10 is a perspective view of a lower surface of the second reinforcement bracket shown removed from the cowl cover in accordance with the exemplary embodiment.
Figure 11:
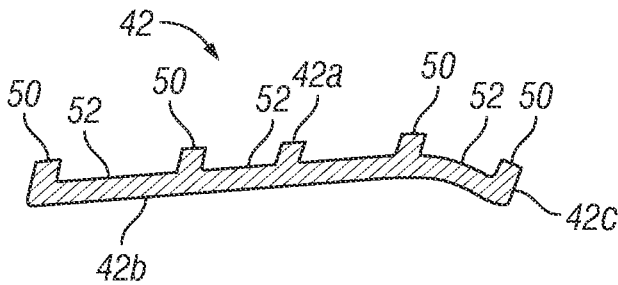
FIG. 11 is a cross-sectional view of the second reinforcement bracket taken along the line 11-11 in FIG. 9 in accordance with the exemplary embodiment.

As shown in FIGS. 9-11, the second reinforcement bracket 42 has an upper surface 42a (FIG. 10) and a lower surface 42b (FIG. 9). The second reinforcement bracket 42 defines a lengthwise direction $D_3$ and a widthwise direction $D_4$. As shown in FIGS. 10 and 11, the upper surface 42a of the second reinforcement bracket 42 includes a plurality of ribs 50, with some of the ribs 50 extending in the lengthwise direction $D_3$ and some of the ribs 50 extending in the widthwise direction $D_4$. A plurality of recessed areas 52 are defined between the ribs 50, as shown in FIGS. 10 and 11. The ribs 50 provide rigidity and strength to the second reinforcement bracket 42.

As shown in FIG. 11, the second reinforcement bracket 42 is not entirely flat. Rather, adjacent to a rearward end 42c, the second reinforcement bracket 42 has a curved or contoured shape that corresponds to the curvature and contoured shape of the cowl cover 18 where the second reinforcement bracket 42 is installed.

As shown in FIG. 3, the upper surface 42a of the second reinforcement bracket 42 is installed to the lower surface 24 of the cowl cover 18 at a location adjacent to the second windshield wiper area 36. The second reinforcement bracket 42 extends laterally (relative to the vehicle 10) along from the second windshield wiper area 36. More specifically, one end of the second reinforcement bracket 42 is located adjacent to the opening 36a. The second reinforcement bracket 42 further extends laterally along but slightly spaced apart from the contoured edge 26 of the cowl cover 18. None of the second reinforcement bracket 42 extends between the opening 36a and the contoured edge 26. The second reinforcement bracket 42 is also preferably made of a thermoplastic polymer such as polypropylene.

Figures 12, 13:
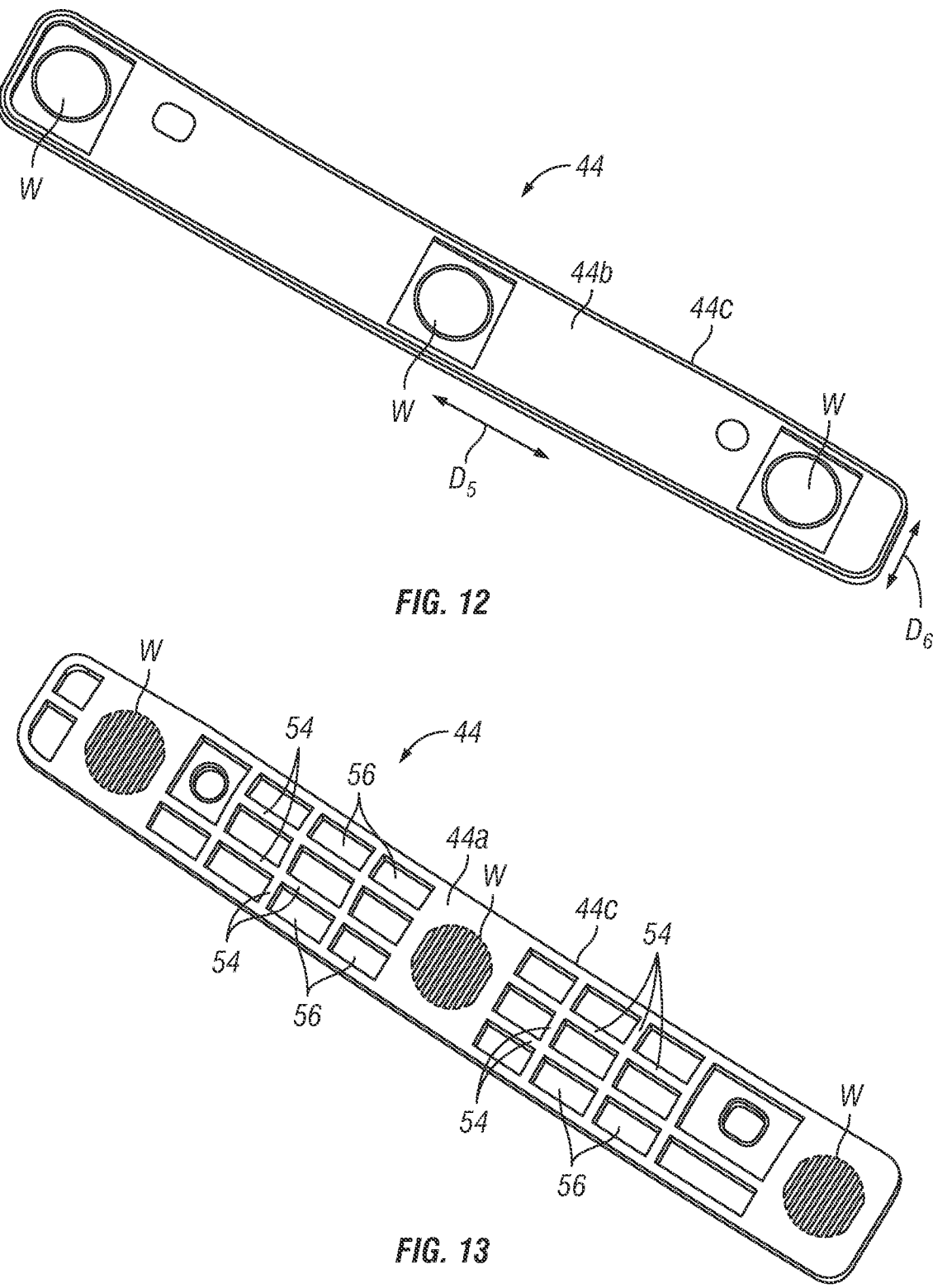
FIG. 12 is a perspective view of an upper surface of the third reinforcement bracket shown removed from the cowl cover in accordance with the exemplary embodiment.
FIG. 13 is a perspective view of a lower surface of the third reinforcement bracket shown removed from the cowl cover in accordance with the exemplary embodiment.

As shown in FIGS. 12 and 13, the third reinforcement bracket 44 has an upper surface 44a (FIG. 13) and a lower surface 44b (FIG. 12). The third reinforcement bracket 44 defines a lengthwise direction $D_5$ and a widthwise direction $D_6$. As shown in FIG. 13, the upper surface 44a of the third reinforcement bracket 44 includes a plurality of ribs 54, with some of the ribs 54 extending in the lengthwise direction $D_5$ and some of the ribs 54 extending in the widthwise direction $D_6$. A plurality of recessed areas 56 are defined between the ribs 54, as shown in FIG. 13. The ribs 54 provide rigidity and strength to the third reinforcement bracket 44.

Like, the first reinforcement bracket 44, the third reinforcement bracket 44 is not necessarily flat but adjacent to a rearward end 44c, the third reinforcement bracket 44 can have a curved or contoured shape that corresponds to the curvature and contoured shape of the cowl cover 18 where the third reinforcement bracket 44 is installed. However, it should be understood from the drawings and the description herein that the area of the cowl cover 18 where the third reinforcement bracket 44 can be flat. In this case, the third reinforcement bracket 44 is also flat.

The third reinforcement bracket 44 is installed at a location adjacent to the lateral end 32, at an opposite end of the cowl cover 18 from the windshield wiper areas 34. Further, the third reinforcement bracket 44 extends inboard away from the lateral end 32. The third reinforcement bracket 44 is also preferably made of a thermoplastic polymer such as polypropylene.

As shown in FIGS. 3 and 4, the second windshield wiper area 36 is positioned between the first reinforcement bracket 40 and the second reinforcement bracket 42.

Each of the first reinforcement bracket 40, the second reinforcement bracket 42 and the third reinforcement bracket 44 is attached to the lower surface 24 of the cowl cover 18 via, for example, sonic welds W. In FIGS. 6-7, 9-10 and 12-13, the weld locations are identified as welds W. Since sonic welding is a conventional attachment procedure, further description of sonic welding is omitted for the sake of brevity.

Other forms of attachment can be used to attach the brackets 40, 42 and 44 to the cowl cover 18, such as heat welding and/or adhesives. Each of the first reinforcement bracket 40, the second reinforcement bracket 42 and the third reinforcement bracket 44 is provided with a second thickness that can be equal to the thickness $T_1$ or can be greater than the thickness $T_1$. Alternatively, the first reinforcement bracket 40, the second reinforcement bracket 42 and the third reinforcement bracket 44 can be unitarily molded with the cowl cover 18. In other words, in the areas where the first reinforcement bracket 40, the second reinforcement bracket 42 and the third reinforcement bracket 44 are attached to the cowl cover 18, the cowl cover 18 can be provided with additional thickness equal to the thickness $T_1$ plus the thickness of the corresponding one of the brackets 40, 42 and 44.

As shown in FIG. 14, a seal 60 is installed between a lower end of the glass windscreen 14 and the lip member 38. One function of the cowl cover 18 is to retain the lip member 38 in position, pressing against the seal 60 and pressing an upper edge of the lip member 38 against the glass windscreen 14. The first, second and third reinforcement brackets 40, 42 and 44 provide added rigidity to the cowl cover 18, thereby stiffening the cowl cover 18 and ensuring retention of the lip member 38 in position along the lower portion of the glass windscreen 14.

The inclusion of the first reinforcement bracket 40, the second reinforcement bracket 42 and the third reinforcement bracket 44 also limits the possibly warpage of the cowl cover 18.

The vehicle 10 includes many features and components that are conventional vehicle features that are well known in the art. Since these features and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle cowl assembly. Accordingly, these terms, as utilized to describe the present invention should be interpreted relative to a vehicle equipped with the vehicle cowl assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cowl assembly, comprising
a cowl cover having an upper surface and a lower surface with a contoured edge shaped to conform to a lower portion of a glass windscreen,
the lower surface of the cowl cover having a plurality of reinforcement brackets fixed thereto positioned adjacent to and spaced from each other along the contoured edge in a direction of the contoured edge and spaced from the glass windscreen, with at least one of the reinforcement brackets located at a central area of the cowl cover adjacent to the contoured edge,
the reinforcement brackets having a surface defined by a length and a width, the length being longer than the width, the surface positioned facing the lower surface of the cowl cover such that the length is positioned adjacent to the contoured edge and extends in the direction of the contoured edge, and
at least one of the reinforcement brackets being welded to the lower surface of the cowl cover.

2. The vehicle cowl assembly according to claim 1, wherein
the cowl cover is molded from a thermoplastic polymer.

3. The vehicle cowl assembly according to claim 2, wherein
the thermoplastic polymer is polypropylene.

4. The vehicle cowl assembly according to claim 1, wherein
the plurality of reinforcement brackets include a first reinforcement bracket and a second reinforcement bracket,
the first reinforcement bracket is positioned adjacent to a first windshield wiper shaft opening, and
the second reinforcement bracket is positioned adjacent to a second windshield wiper shaft opening.

5. The vehicle cowl assembly according to claim 1, wherein the plurality of reinforcement brackets includes a first reinforcement bracket and a second reinforcement bracket, and the cowl cover includes a windshield wiper area that is positioned between the first reinforcement bracket and the second reinforcement bracket.

6. The vehicle cowl assembly according to claim 5, wherein the cowl cover includes a second windshield wiper area that is positioned at one lateral end of the cowl cover adjacent to one of the first reinforcement bracket and the second reinforcement bracket.

7. The vehicle cowl assembly according to claim 1, wherein the plurality of reinforcement brackets includes a first reinforcement bracket located between a first windshield wiper shaft opening and the contoured edge of the cowl cover.

8. The vehicle cowl assembly according to claim 7, wherein the plurality of reinforcement brackets includes a second reinforcement bracket that extends laterally away from a second windshield wiper shaft opening such that the second reinforcement bracket is not located between the second windshield wiper shaft opening and the contoured edge.

9. The vehicle cowl assembly according to claim 1, wherein at least one of the reinforcement brackets is located adjacent to one lateral end of the cowl cover.

10. The vehicle cowl assembly according to claim 1, wherein the one of the reinforcement brackets located at the central area of the cowl cover is also located adjacent to a windshield wiper shaft opening.

11. The vehicle cowl assembly according to claim 1, wherein at least one of the reinforcement brackets is welded to the lower surface of the cowl cover via sonic welding.

12. The vehicle cowl assembly according to claim 1, wherein the plurality of reinforcement brackets includes a first reinforcement bracket, a second reinforcement bracket and a third reinforcement bracket.

13. The vehicle cowl assembly according to claim 12, wherein the first reinforcement bracket extends between a windshield wiper shaft opening and the contoured edge of the cowl cover.

14. The vehicle cowl assembly according to claim 12, wherein the second reinforcement bracket extends laterally away from a windshield wiper shaft opening such that the second reinforcement bracket is not located between the windshield wiper shaft opening and the contoured edge.

15. The vehicle cowl assembly according to claim 12, wherein the third reinforcement bracket is located adjacent to one lateral end of the cowl cover.

16. The vehicle cowl assembly according to claim 12, wherein the second reinforcement bracket is located at the central area of the cowl cover adjacent to the contoured edge.

17. A vehicle cowl assembly, comprising a cowl cover having an upper surface and a lower surface with a contoured edge shaped to conform to a lower portion of a glass windscreen, the lower surface of the cowl cover having a plurality of reinforcement brackets fixed thereto positioned adjacent to and spaced from each other along the contoured edge in a direction of the contoured edge and spaced from the glass windscreen, with at least one of the reinforcement brackets located at a central area of the cowl cover adjacent to the contoured edge, the reinforcement brackets having a surface defined by a length and a width, the length being longer than the width, the surface positioned facing the lower surface of the cowl cover such that the length is positioned adjacent to the contoured edge and extends in the direction of the contoured edge, and the lower surface of the cowl cover including a plurality of snap-fitting projections that extend into corresponding openings in a seal structure that includes a projection that extends beneath the lower portion of the glass windscreen.

18. A vehicle cowl assembly, comprising a cowl cover having an upper surface and a lower surface with a contoured edge shaped to conform to a lower portion of a glass windscreen, the lower surface of the cowl cover having a plurality of reinforcement brackets fixed thereto positioned adjacent to and spaced from each other along the contoured edge in a direction of the contoured edge and spaced from the glass windscreen, with at least one of the reinforcement brackets located at a central area of the cowl cover adjacent to the contoured edge, the reinforcement brackets having a surface defined by a length and a width, the length being longer than the width, the surface positioned facing the lower surface of the cowl cover such that the length is positioned adjacent to the contoured edge and extends in the direction of the contoured edge, and the plurality of reinforcement brackets includes a first reinforcement bracket, a second reinforcement bracket and a third reinforcement bracket, each of the first reinforcement bracket, the second reinforcement bracket and the third reinforcement bracket being welded at predetermined locations to the lower surface of the cowl cover.

19. The vehicle cowl assembly according to claim 18, wherein the first reinforcement bracket is positioned adjacent to a first windshield wiper shaft opening, and the second reinforcement bracket is positioned adjacent to a second windshield wiper shaft opening.

20. The vehicle cowl assembly according to claim 18, wherein the first reinforcement bracket extends between a windshield wiper shaft opening and the contoured edge of the cowl cover, the second reinforcement bracket extends laterally away from a windshield wiper shaft opening such that the second reinforcement bracket is not located between the windshield wiper shaft opening and the contoured edge of the cowl cover, and the third reinforcement bracket is located adjacent to one lateral end of the cowl cover.

* * * * *